310-369 SR
XR 3,074,034
OSS REFERENCE SEARCH ROOM

Jan. 15, 1963 J. W. CROWNOVER 3,074,034

DISK RESONATOR

Filed Jan. 15, 1959 2 Sheets-Sheet 1

INVENTOR:
Joseph W. Crownover

By Marvin H. Kleinberg
Attorney

Jan. 15, 1963 J. W. CROWNOVER 3,074,034

DISK RESONATOR

Filed Jan. 15, 1959 2 Sheets-Sheet 2

INVENTOR:
Joseph W. Crownover

By Marvin H. Kleinberg
Attorney

United States Patent Office 3,074,034
Patented Jan. 15, 1963

3,074,034

DISK RESONATOR

Joseph W. Crownover, La Jolla, Calif., assignor, by mesne assignments, to Litton Systems Inc., Beverly Hills, Calif., a corporation of Maryland Filed Jan. 15, 1959, Ser. No. 786,938
12 Claims. (Cl. 333—72)

This invention relates to electro-mechanical disk resonators and more particularly to an improved single resonator disk which can be used as an IF filter, voltage transformer, or as shunt or series coupler in IF circuits, and a method for producing same.

In recent years, researchers have found the disks of suitable dimensions and materials resonate at frequencies of vibration of the same order of magnitude as oscillatory frequencies utilized in electrical communication systems. Electrical signals, if first translated into mechanical vibrations, can be applied to these resonator disks and are transmitted as mechanical vibrations. Should the oscillation frequency of the applied electrical signal approach the frequency of mechanical resonance of the disk, the amount of transmitted energy increases markedly, and, at the resonant frequency, signal transmission is at a maximum. When the mechanical vibrations are translated back to an oscillating electrical signal, the resultant effect is comparable to that achieved by the passage of the same electrical signal through an electrically resonant network having resistive and reactive elements. In contrast to the response of the purely electrical filter network, however, the mechanical resonator has an extremely selective pass band of narrow width.

Mechanical disk resonators have been dealt with in an article by J. C. Hathaway and D. F. Babcock, entitled, "Survey of Mechanical Filters and Their Application" at page 5 of the January 1957, Proceedings of the IRE and the several types of mechanical filters commercially in use are described therein. These filters, when operated with suitable input and output transducers, have electrical response properties which make them far superior to the equivalent electrically resonant tuned circuits as filters in intermediate frequency (IF) applications. Because of the extremely narrow pass band of an individual resonator, several must be mechanically coupled together to respond as a single unit to the frequencies within the pass band of desired width. Fabrication techniques vary, some filters being designed so that each disk is tuned to a different frequency within the pass band, the response of the combination being highly selective at the limit frequencies. In another filter design, several disks are tuned to the center frequency and there are, alternating with these, impedance matching disks that are tuned to an off-center frequency, and which, therefore, exhibit high mechanical impedance at the center of the pass band.

Piezoelectric ceramic disks can also be used as mechanical resonators and have the additional advantage of not requiring additional transducer elements to convert electrical energy into vibrational energy and vice versa. Researchers have long utilized piezoelectric resonators in electrical circuits and an article at page 862 of the 1938 Proceedings of the IRE, entitled, "Piezoelectric Resonators in High Frequency Oscillation Circuits" by Y. Watanabe, shows and describes some of these applications. The recent patent to C. A. Rosen, et al., No. 2,830,274, granted April 8, 1958, also deals with piezoelectric resonant bodies, describes their properties generally, and sets forth combinations of specially polarized ceramic devices which can be used, among other things, as transformers.

Special piezoelectric disk resonators, suitable for use in intermediate frequency communication circuits have been described in an article entitled, "New Developments in Piezoelectric Ceramic IF Band Pass Filters" by D. Elders and E. Gikow in the Proceedings of the 1957 Electronic Components Symposium at page 33, and also in a subsequent article in the 1958 IRE Convention Record, Part 6, at pages 235 to 242, entitled "Application of Piezoelectric Resonators to Modern Band Pass Amplifiers" by A. Lungo and K. W. Henderson. These articles explain in detail, the principles of making and using ceramic disk resonators as filters, amplifiers, and as series or shunt couplers. Circuits combining two or more disks of different resonant frequencies can be used in IF filter applications the performance of which is superior to that of conventional single and double tuned IF filter transformers. Single disks can be fabricated which have a pass band width of from 3.5 to 5.5% of the center frequency with reasonably good selectivity.

As pointed out in the above mentioned articles, the resonant frequency of a disk is related to the dimensions of the disk and the material from which it is made. Operating in the radial mode, the resonant frequency is inversely related to the diameter of the disk and is also affected by the thickness of the disk. The ratio of the dimensions must be maintained within limits to preserve vibration in the radial mode. In order to assure a reasonable electrode area, overtone frequencies are frequently utilized in a frequency range that would otherwise require an extremely small disk if operating at the fundamental frequency. The first overtone is not harmonically related to the fundamental in the radial mode so that it may be employed without spurious resonant effects throughout frequency range of interest.

The extreme selectivity and sensitivity of disk resonators is a desirable feature to be retained in a filter or transformer. However, the assembling and tuning of several disks to provide the desired band width results in a more costly component of greater size and complexity than an individual resonator disk, and requires extremely precise fabricating techniques. With certain piezoelectric ceramics, suitable modification of the ceramic compound may result in a sufficiently degraded Q which can provide an increased band width, but the selectivity is degraded, as well.

A single disk resonator can suffice in those applications requiring extreme selectivity, sensitivity, and a relatively wide frequency pass band, effecting great savings in time, cost, and materials. Such a resonator could serve as an IF transformer filter, or as either a series or shunt coupler in electrical networks. A single resonator is obviously more compact in size and is more easily fabricated than the plural element devices of the prior art. Also, individual resonators may be used as "lumped-constant" elements in data processing and computer applications.

According to the present invention, a resonator is provided which selectively transmits only a portion of an applied, broad frequency spectrum signal. A prnicipal resonant frequency of vibration of a resonator disk is first determined by any one of several methods, such as applying a fixed amplitude signal from a variable frequency signal generator to the resonator and observing the derived output signal on an oscilloscope to ascertain the frequency at which the output signal reaches a maximum. Depending upon the dimensions, of the disk, the peak output signal in the frequency range of interest may be either at the fundamental resonant frequency or at an overtone and may be referred to as the principal resonant frequency.

When the principal resonant frequency is ascertained, an indentation or notch is cut into the periphery of the disk and the frequency spectrum is again swept. A second, or ancillary frequency of resonance now occurs in addition to the principal resonant frequency, but at a slightly higher frequency. By increasing the radial depth of the notch, the frequency of the ancillary resonance can be raised. For a desired pass band of, for example, 50 kilocycles, the notch is deepened until the ancillary resonance is observed at a frequency 50 kilocycles higher than the principal resonant frequency. The notch is then widened to increase the amplitude of the output signal at the ancillary frequency. In order to have uniform response over the pass band, the response at the principal resonant frequency and the ancillary resonant frequency should be the same for input signals of the same magnitude, and may be achieved by either cutting additional notches of varying depth in the periphery of the resonator or by cutting the first notch to a configuration of suitable depth and width to provide a substantially equal amplitude response continuously throughout the entire pass band.

The frequency at which other ancillary resonant points occur depends upon the radial depth of the additional notches, or, in the case of a single, wide notch, upon the radius of each resonating sector included by the notch. If the radius is a smoothly increasing function, then the frequency of resonant response will be a correspondingly continuous function.

Cutting the notch to provide additional resonances is easily made a fully automatic operation by controlling cutting equipment with an error signal until an output signal of predetermined amplitude is provided at each of the frequency points of the pass band. A notch can be both widened and deepened in response to these error signals until an output signal of uniform amplitude is detected over a preselected frequency range. In lieu of a single notch, any number of smaller notches may be added to the disk, each of which provides a resonance, the frequency and amplitude of which corresponds to the dimensions of the notch.

Another method of physically altering the resonator includes punching or drilling apertures through the disk which do not extend to the periphery. These apertures may be circular, oval, elliptical or some other shape. The response to these apertures might be theoretically predicted if it is assumed that every sector of the disk has a resonant vibration frequency depending upon the radius of each incremental sector bounded by the aperture. The amplitude of response is correlated to the width of the resonating sector. It should then be possible to design a resonator, the output of which corresponds to a predetermined function.

Accordingly, it is an object of the present invention to provide a unitary resonator suitable for use as an intermediate frequency filter to selectively pass a limited band of frequencies from a broad band input signal.

It is another object to the invention to construct an IF voltage transformer from a single disk resonator.

It is still another object of the invention to construct an intermediate frequency filter from a single disk resonator.

It is a further object of the invention to construct an improved lumped-constant delay section from a single disk resonator.

It is still further object to provide an improved, single disk piezoelectric resonator suitable for use as an IF filter to transmit a narrow band of frequencies selected from a wide frequency band input signal.

It is another object of the invention to construct a single disk piezoelectric ceramic resonator suitable for use as an IF voltage transformer.

It is a further object of the invention to construct a piezoelectric ceramic disk resonator having an output response corresponding to a predetermined mathematical function.

It is a still further object of the invention to provide a method of constructing an improved filter from a single disk resonator.

It is still another object of the invention to provide a method of constructing an improved IF transformer from a single disk resonator.

It is a further object of the invention to provide a method of constructing an improved lumped-constant delay section from a single disk resonator.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 1:
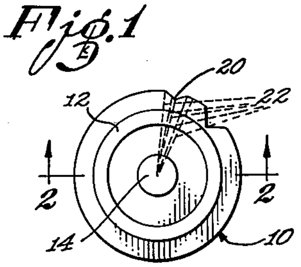
FIGURE 1 is a top view of a piezoelectric ceramic disk resonator having a single indentation according to the present invention.

With reference now to FIGURE 1, a typical disk resonator 10 is shown, modified according to the present invention. A preferred embodiment shown, uses a piezoelectric ceramic disk resonator made up of barium titanate ($BaTiO_3$) which has been electrically polarized perpendicular to the surface of the disk. Disks fabricated of other compounds are also suitable, such as, for example, compounds of barium titanate with a small percentage of lead titanate added, or, as pointed out in the articles by Elders and Gikow and by Lungo and Henderson, solid state solutions of lead titanate-lead zirconate may be used, after polarization.

Figure 2:
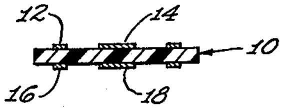
FIGURE 2 is a side sectional view of the disk of FIGURE 1 taken along line 2—2 in the direction of the appended arrows.

In FIGURE 2, a side sectional view of the disk 10 of FIGURE 1 is shown taken along line 2—2 in the direction of the appended arrows. Referring to both figures, a first ring electrode 12 is fired or plated on the upper surface of the disk as viewed in the figures. Concentric with the ring electrode, a dot electrode 14 is centered on the same face. On the reverse, or lower face of the disk 10, a similar arrangement is found. A second is fired or plated on the face concentric with a centrally located dot electrode 18. The electrodes apply an electrical potential to the disk which causes a physical change in the ceramic. The physical change itself generates an electrical potential which can be detected at another of the electrodes. If an applied input signal includes, as a frequency component, an oscillation frequency coinciding with a natural resonant frequency of the disk, the electrical energy at that frequency can be transmitted through the disk with great efficiency and the other frequency components are attenuated.

A first notch 20 is cut in the peripheral edge of the disk 10, which, as is explained in detail below, produces an ancillary resonant response in the disk 10. The notch 20 may be considered as a plurality of adjacent incremental sectors 22 each having a different radius. Each sector 22 resonates at a frequency determined by the radial distance from the center of the disk to the edge of the sector.

Figure 3:
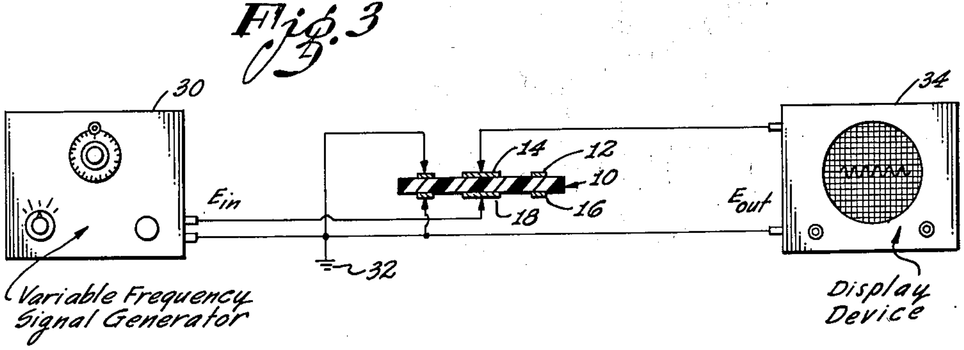
FIGURE 3 is a generalized representation of means for measuring the frequency response of a resonator disk.

In FIGURE 3, one form of circuit for measuring the resonant frequencies of a disk is shown. A variable frequency signal generator 30, generates an oscillating signal over a wide frequency range. The generator 30, which may be any one of the many types commercially available, includes controls for regulating the voltage amplitude and the frequency of the generated signal. One output terminal of the signal generator 30 is connected to a source of a common reference potential 32, as indicated by the conventional ground symbol. The second output terminal of the generator 30 is electrically connected to the lower dot electrode 18 of the disk 10.

In one arrangement, both the ring electrodes 12, 16 of the disk 10 are connected to the common reference potential source 32. An output signal is derived from the dot electrode 14 of the upper face, and is electrically connected to one input terminal of a suitable display device, such as a cathode ray oscilloscope 34. The common reference source 32 is connected to a second input terminal of the oscilloscope 34. Other embodiments might employ a simpler output display device, such as an ordinary A.-C. volt meter, in which case the deflection of the needle would indicate the relative magnitude of the output signal at different frequencies.

Figure 4:
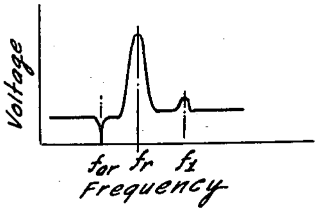
FIGURE 4 is a graph plotting output signal amplitude against frequency for a resonator disk having a notch according to the present invention.

FIGURE 4 is a graph of the output signal amplitude for an input signal of a fixed magnitude plotted against frequency for a typical resonator disk 10, modified with a single peripheral notch 20 according to the present invention. As may be seen from the graph, the input signal applied to the resonator results in an output signal that is relatively independent of frequency at frequencies below the parallel resonant or anti-resonant frequency of the disk.

At the anti-resonant frequency, indicated by the symbol $f_{ar}$, the amplitude of the output signal sharply drops to a value which, by adjustment of the input signal magnitude has been made 0, and which therefore serves as a lower level reference for the disk output signals. With an increase in the frequency of the input signal, the output signal amplitude first rises to the magnitude of the previous level and then sharply increases to a maximum peak at the frequency corresponding to the resonant frequency of the disk in the radial mode of vibration. This frequency will be considered a principal frequency of resonance, $f_r$. The principal frequency may be a fundamental or one of the overtones, depending upon the thickness and radius of the disk.

The graph represents the results obtained using a $BaTiO_3$ disk having a .51" diameter and a .1" thickness, which was tested with the arrangement of FIGURE 3. An 8.0 volt A.C. input signal was applied and the anti-resonant frequency, $f_{ar}$, was measured to be 232.0 kc. At the principal resonant frequency, $f_r$, of 249 kc., the disk produced an output signal of 12.5 volts. With an increase in frequency, the amplitude fell off to a value of about 8.0 volts. The disk was then modified by the introduction of a notch in the periphery. The tests were repeated and the output results were substantially identical for frequencies up to 249.0 kc. Then, as the frequency was increased to 251.5 kc., a second peak was noted, having an amplitude of 10.0 volts representing the ancillary resonant frequency $f_1$. At higher frequencies, the output signal fell back to 8.0 volts and remained substantially at that value.

Figure 5:
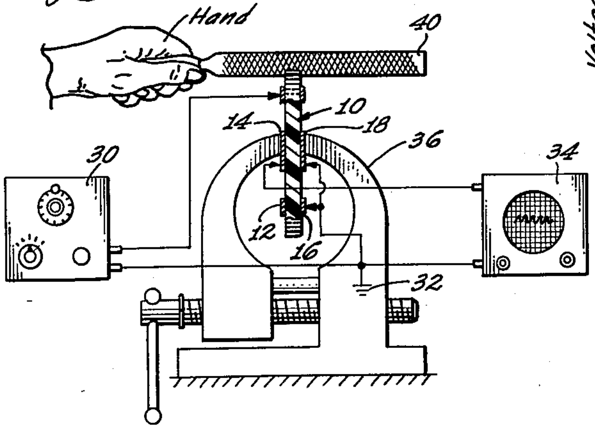
FIGURE 5 is a sketch of one arrangement for practicing a method of introducing ancillary frequencies of resonance.

FIGURE 5 is a schematic representation of a process for producing a second or ancillary resonance frequency response in a disk resonator so that a single disk can be used as a filter. A disk resonator 10 is electrically connected, as in FIGURE 3, to a variable frequency source 30 and a display device 34 and is firmly held by resilient clamps 36. The resonant frequency of the disk 10 is then determined as described above.

If the principal resonant frequency $f_r$ is too low for the desired application, such as, for example, a band pass filter the disk may be ground to a smaller diameter, thereby raising the principal resonant frequency. If, on the other hand, the frequency is too high, one or both of the plane surfaces of the disk may be lapped or ground, to lower the resonant frequency. As pointed out in the abovementioned articles dealing with piezoelectric ceramics, the resonant frequency is determined by the diameter of the disk, in the case of the ideal thin disk. In practical disks, the thickness is not negligible and the frequency is then also related to the ratio of disk thickness to diameter. As the ratio increases, the frequency decreases, within limits. The area of the electrode, which determines the impedance of the resonator also affects the frequency, in an inverse relationship.

For simplicity in fabrication, if the lowest transmitted frequency of the pass band is identical to the frequency of principal resonance, $f_r$, the highest frequency to be passed by the filter should then coincide with an ancillary frequency of resonance, which may be expressed as the principal resonant frequency plus the desired pass bandwidth. Stated differently, the relative attenuation of an applied input signal should be at a minimum for signal components in the frequency range between the principal and ancillary resonant frequencies.

A file 40 or other cutting device is applied to the periphery and a shallow notch is cut. The frequency of the input signal is now varied and the output signal on the oscilloscope 34 is carefully examined for an ancillary resonant peak. The magnitude of the response at the ancillary resonance can be increased by widening the notch just cut until the peak becomes pronounced and the frequency determined. In all likelihood, the ancillary resonance will be below the desired upper pass band frequency. The frequency of the ancillary resonant point can be raised by deepening the notch. Preferably, the depth is increased slowly so that the desired upper frequency point is not exceeded. An increase in the angular width of the notch serves to maintain the ancillary resonant signal output at a usable value. When the ancillary resonance point coincides with the desired upper limit frequency, further modification of the disk is limited to increasing the width of the indentation to increase the magnitude of the response.

The magnitude of the output signal is adjusted to be as great at the principal resonant frequency as at the ancillary resonant frequency for an input signal of fixed magnitude. The magnitude of response to the input signals of other frequencies within the pass band can be increased by providing additional notches of lesser depth and of appropriate width.

Each additional notch contributes an ancillary resonance, the frequency and magnitude of which is determined by the depth and width of the notch, respectively. A plurality of notches, all at the same depth, will only increase the magnitude of the response at the frequency determined by that depth.

In an alternative embodiment of the method, a single notch is cut into the periphery of the disk. Means can be provided to continuously vary the input signal frequency and to coordinate the output device to provide a trace of the frequency range including the pass band. The notch can then be tailored to provide the desired "square"-top output if amplitude is plotted against frequency. If each incremental sector of the disk is considered as a resonating element, then it may be seen that each sector will contribute a resonance that is determined by the radius and the width of the sector. A single notch can therefore provide a virtually continual resonance throughout the desired pass band by careful shaping of the notch.

The above described method is easily adapted to producing devices other than filters. As may be readily appreciated, special applications require unique response characteristics. By using a disk resonator, virtually any response characteristic can be achieved. If the desired response can be represented on a graph, the actual response of the disk can be adjusted by altering width and depth of one or more notches until the desired response is approached to any required degree of approximation.

Figure 6:
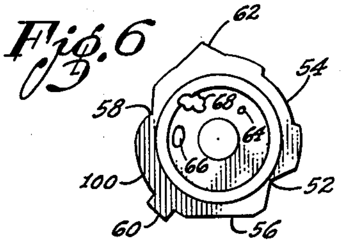
FIGURE 6 is a top view of a resonator disk showing alternative modifying configurations.

To achieve special or unique responses, other modifications can be made to the disk resonator of FIGURE 1. Several of these possible configurations are shown in FIGURE 6. It has been pointed out above, that the frequency of ancillary or additional resonance is directly related to the radius of the incremental sector resonating at that frequency, and that the amplitude of the response is related to the width of the incremental resonating sector. In many of the experiments with piezoelectric ceramic disks, in which the ancillary responses were first observed, a wedged shaped indentation 52 was made in a disk 100 inasmuch as such a notch was more easily formed with a file, by hand.

Where an extremely sharp and narrow response is desired, a sector notch 54 may be used, in which the sides of the notch 54 are straight line extensions of the radius. A much less steep response is obtained if a flat 56 is ground into the peripheral edge of the disk. Because of the intermediate resonant frequencies, such a modification would result in a fairly wide resonant range. An irregularly shaped notch 58, having, for example, one straight side and one curved side may result after a disk has been modified to achieve a specific response which is non linear or otherwise irregular. It may easily be seen there are no real limits to the form that a modifying indentation might take.

Ancillary resonances at frequencies below the principal resonance frequency may be produced by tabs or protuberances on the periphery of the disk 100. A tab may be considered as the portion of a larger diameter disk that remains after cutting a notch that is wider than 180° of arc. As shown in FIGURE 6, a straight sided tab 60 results from grinding a straight sided notch (such as sector notch 54) to extend through approximately 330° of arc. Similarly, a pointed notch 62 results from extending a slant-sided notch such as the wedge shaped notch 52 to approximately 360° at the periphery. The straight sided tab 60 produces a fairly sharp ancillary resonance below the frequency of principal resonance. The pointed tab 62 results in a much less sharp resonant response.

Depending on the mechanical properties of the material used and the dimensions of the resonator, the choice of a particular modification can easily be an empirical one. Additional variations which are better adapted to automatic fabrication and production include a drilled or punched hole of circular shape 64, elliptical shape 66, or even an irregular shaped aperture 68.

In practice, the various modifications can be applied initially on a "cut-and-try" basis to find the optimum response for each application. It is to be understood that it is well within the skill of the art to carry forward the present invention to include unusual and irregular notches or apertures to produce a special frequency response as pointed out above.

Figure 8:
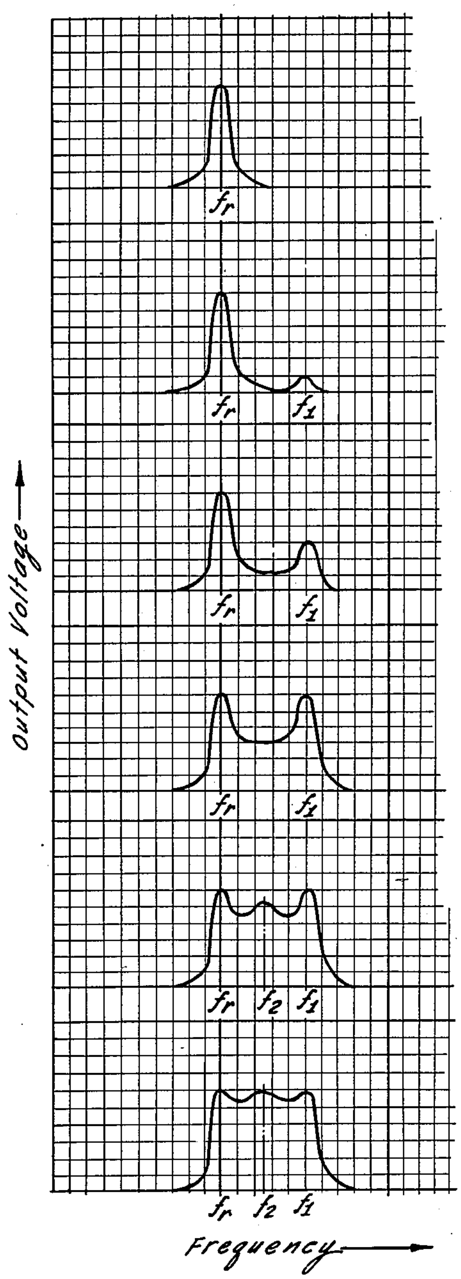
FIGURE 8 is made up of FIGURES 8*a* through 8*f* and is a sequence of graphs each representing the frequency response of a corresponding one of the disks of FIGURES 7*a*–7*f*.
Figure 7:
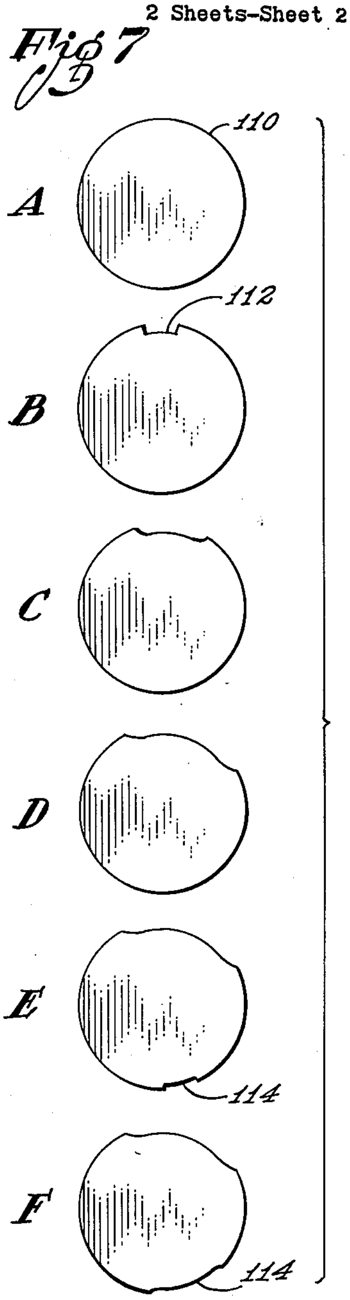
FIGURE 7 is made up of FIGURES 7*a* through 7*f*, and is a sequence of top views of a resonator disk during the process of widening the pass band width for IF filter purposes according to one embodiment of the present invention.

FIGURES 7 and 8 consisting of FIGURES *7a–7f* each of which corresponding to one of FIGURES *8a–8f*, illustrate a step-by-step process of making an intermediate frequency filter from a single disk resonator. As set forth in the sequence A.-F., a disk 110 without modification, seen in *7a*, exhibits a sharp resonant response at freqeuncy $f_r$ shown in FIGURE *8a*. A first notch 112 is cut into the periphery of the disk at *7b*, which is deepened until there is an ancillary resonant response at $f_1$. As seen in FIGURE *8b*, there is still the response at $f_r$ and it may be noted that the response at $f_1$ is of limited amplitude. The notch 112 is widened, taking care not to increase the radial depth of the notch, best seen in FIGURES *7c* and *7d*. The resultant effect on the response curve in FIGURES *8c* and *8d* appears as an increase in the magnitude of output signal $f_1$ to increase the response at intermediate frequencies. A second notch is added at 114, best shown in FIGURE *7e* and the corresponding response is noted at $f_2$ at FIGURE *8e*. The width of the second notch 122 is increased. Both notches are widened with a decreasing radial depth and the response is distributed uniformly over the pass band as shown in FIGURE *7f* and the corresponding graph of FIGURE *8f*. It is seen that the disk 110 is able to pass signals in the frequency range from $f_r$ through $f_2$ to $f_1$ and is virtually insensitive to signals of frequencies above and below those points.

Single resonator disks can thus be modified to transmit to all signals within a fairly wide pass band about the principal resonant frequency of the disk by suitably placing and dimensioning apertures or indentations in the disk. The method of modifying the disks can be practiced either by hand or by an automatic set up in response to a fed back signal from the disk being modified. The resultant modified disk occupies less space and provides better response than the multiple disk device of the prior art, and at lower cost.

Although, the invention is practiced with disk resonators in the preferred embodiments, wafer or plate resonators of other shapes can also be modified by notching or punching to produce additional ancillary resonances.

What is claimed as new is:

1. A filter circuit responsive to an input signal having a plurality of component frequencies for passing only predetermined ones of said component frequencies, said filter circuit comprising: input means including a pair of input terminals for receiving the applied input signal; a resonator disk having a cut out portion in the rim of said disk, said disk being coupled across said input terminals and responsive to said input signal for vibrating in the radial mode simultaneously at a principal frequency corresponding to one of said predetermined component frequencies and at an ancillary frequency corresponding to another of said predetermined frequencies, said principal frequency being determined by the dimensions of said disk and said ancillary frequency being determined by the dimensions of said cut out portion in the rim of said disk; and an output terminal coupled to said disk to receive an output signal generated by the vibrations of said disk.

2. An amplifier filter operable in response to an applied input signal made up of many component frequencies for selectively amplifying signals within a predetermined frequency range, said filter comprising: input means for receiving the input signal; a wafer resonator connected to said input means and responsive to the applied input signal for resonating at a principal frequency to produce an output signal at said principal frequency, said wafer having an indentation in the rim of said wafer of predetermined depth and width for causing said wafer to simultaneously resonate at additional frequencies within the predetermined frequency range to produce corresponding additional frequency components in said output signal; and output means connected to said resonator for receiving said output signal.

3. A filter responsive to an input signal having a continuous spectrum of input frequencies for passing a predetermined band of frequencies within the input signal, said filter comprising: a pair of input terminals for receiving the applied input signal; a piezoelectric resonator disk having a cut out portion in the rim of said disk, said resonator disk being coupled across said input terminals and responsive to said input signal for vibrating simultaneously at a principal frequency corresponding to the lower end of the band and at an ancillary frequency corresponding to the upper end of the band, said principal frequency being determined by the dimensions of said disk and said ancillary frequency being determined by the dimensions of said cut out portion; and an output terminal coupled to said disk to receive the multifrequency electrical signal generated by the vibrations of said disk.

4. The filter of claim 3 wherein the ancillary frequency of vibration is determined by the radial depth of said cut out portion.

5. The filter of claim 3 wherein the magnitude of response at said ancillary frequency relative to the magnitude of response at said principal frequency is determined by the peripheral width of said cut out portion.

6. The method of extending the pass band of a unitary peizoelectric ceramic resonator to encompass a predetermined frequency range comprising the steps of: measuring the magnitude of response of said resonator at the principal resonant frequent of said resonator to an input signal of predetermined magnitude; cutting away a portion of the resonator until a response is simultaneously produced to the input signal at an ancillary second resonant frequency measuring the magnitude of the response to the input signal at the second resonant frequency; and increasing the area of said cut out portion to increase the magnitude of the response to the input signal at the second resonant frequency, said second resonant frequency being included in the predetermined frequency range.

7. The method as in claim 6 above including the further steps of cutting away additional portions of said resonator for producing resonant responses at other frequencies higher than the principal resonant frequency within said predetermined frequency range, each additional cutting away determining the frequency and magnitude of the corresponding resonant response by the depth and width, respectively, of the cut.

8. A filter responsive to an input signal having a continuous spectrum of input frequencies for passing a predetermined band of frequencies within the input signal, said filter comprising: a pair of input terminals for receiving the applied input signal; a piezoelectric resonator disk having a cut out portion in the rim of said disk, said resonator disk being coupled across said input terminals and responsive to said input signal for vibrating simultaneously, at a principal frequency corresponding to the lower end of the band, at a first ancillary frequency corresponding to the upper end of the band, and at a plurality of ancillary frequencies intermediate the upper and lower ends of the band, said principal frequency being determined by the dimensions of said disk, and said ancillary frequencies being determined by the dimensions of said cut out portion; and an output terminal coupled to said disk to receive the electrical signal generated by the vibrations of said disk.

9. A filter for selectively passing a predetermined band of frequencies from an applied multifrequency input signal simultaneously including at least a first and second frequency within the predetermined band of frequencies, said filter comprising: input means for receiving the input signal; a unitary resonator disk connected to said input means and responsive to said input signal for vibrating in the radial mode, said disk including first and second incremental sectors of said disk vibrating radially at said first and second frequencies, respectively, in response to the applied input signal, said disk generating an output signal simultaneously including the frequencies of said vibrating incremental sectors; and output means connected to said disk for receiving said output signal.

10. A filter for selectively passing a predetermined band of frequencies from an applied multifrequency input signal including a first, a second, and a third frequency within the predetermined band of frequencies; said filter comprising: input means for receiving the input signal; a unitary resonator disk connected to said input means and responsive to the input signal for vibrating in the radial mode to generate an output signal simultaneously including said first, second, and third frequencies, said disk including at least first, second and third incremental radial sectors vibrating radially at said first, second and third frequencies, respectively, in response to the applied input signal; and output means connected to said disk for receiving said output signals.

11. A filter for selectively passing predetermined frequencies from an applied multifrequency input signal including at least a first and a second frequency among the predetermined frequencies, said filter comprising: input means for receiving the input signal; a unitary resonator disk connected to said input means for vibrating in the radial mode to generate an output signal made up of the first and second frequencies, said disk vibrating radially at said first frequency in response to the applied input signal, said disk including an incremental radial sector simultaneously vibrating radially at said second frequency in response to the applied input signal; and output means connected to said disk for receiving said output signal.

12. A filter circuit for passing a predetermined band of frequencies from an applied multifrequency input signal, said circuit comprising: input means for receiving an input signal having frequencies within the predetermined band; a piezoelectric ceramic resonator disk connected to said input means and responsive to the input signal for vibrating in the radial mode to generate an output signal simultaneously including the predetermined band of frequencies, said disk including a plurality of radial sectors each vibrating radially and resonating at a different frequency within the predetermined band, the resonating frequency of each sector being related to the radial length of the sector; and output means connected to said disk for receiving the output signal generated by said resonating radial sectors.

References Cited in the file of this patent

UNITED STATES PATENTS

| | | |
|---|---|---|
| 2,262,966 | Rohde | Nov. 18, 1941 |
| 2,447,061 | Franklin | Aug. 17, 1948 |
| 2,699,508 | Fastenau | Jan. 11, 1955 |
| 2,830,204 | Harris | Apr. 8, 1958 |
| 2,870,521 | Rudnick | Jan. 27, 1959 |
| 2,885,887 | Hanysz | May 12, 1959 |
| 2,886,787 | Broadhead | May 12, 1959 |
| 2,943,279 | Mattiat | June 28, 1960 |

FOREIGN PATENTS

| | | |
|---|---|---|
| 5133/26 | Australia | Dec. 9, 1926 |

OTHER REFERENCES

Elders et al.:"Electronics," Engineering Edition, April 25, 1958, pages 59–61.